US012608247B2

(12) United States Patent
Caudill et al.

(10) Patent No.: US 12,608,247 B2
(45) Date of Patent: Apr. 21, 2026

(54) APPLICATION PROGRAMMING INTERFACE (API) MANAGEMENT AND DEVELOPMENT

(71) Applicant: Palantir Technologies Inc., Denver, CO (US)

(72) Inventors: Elizabeth Caudill, San Francisco, CA (US); Siyuan Chen, Mountain View, CA (US); Parker Phillips, San Francisco, CA (US); Samuel Rogerson, Palo Alto, CA (US)

(73) Assignee: Palantir Technologies Inc., Aventura, FL (US)

( * ) Notice: Subject to any disclaimer, the term of this patent is extended or adjusted under 35 U.S.C. 154(b) by 11 days.

(21) Appl. No.: 18/634,577

(22) Filed: Apr. 12, 2024

(65) Prior Publication Data

US 2024/0272962 A1 Aug. 15, 2024

Related U.S. Application Data

(63) Continuation of application No. 17/933,310, filed on Sep. 19, 2022, now Pat. No. 11,983,579, which is a continuation of application No. 15/961,535, filed on Apr. 24, 2018, now Pat. No. 11,467,887.

(60) Provisional application No. 62/641,615, filed on Mar. 12, 2018.

(51) Int. Cl.
| | |
|---|---|
| *G06F 9/54* | (2006.01) |
| *G06F 3/04847* | (2022.01) |
| *G06F 16/27* | (2019.01) |

(52) U.S. Cl.
CPC ............ *G06F 9/54* (2013.01); *G06F 3/04847* (2013.01); *G06F 16/27* (2019.01)

(58) Field of Classification Search
None
See application file for complete search history.

(56) References Cited

U.S. PATENT DOCUMENTS

| | | | |
|---|---|---|---|
| 7,319,948 B2 * | 1/2008 | Levin ................. | G06F 9/45504 |
| | | | 703/23 |
| 8,151,189 B2 | 4/2012 | Sukendro | |
| 9,823,950 B1 | 11/2017 | Carrier et al. | |
| 10,922,357 B1 | 2/2021 | Chennuru et al. | |
| 11,467,887 B1 | 10/2022 | Caudill et al. | |
| 11,983,579 B2 | 5/2024 | Caudill et al. | |
| 2004/0167975 A1 | 8/2004 | Hwang et al. | |
| 2011/0099159 A1 | 4/2011 | Trevor et al. | |
| 2014/0052617 A1 | 2/2014 | Chawla et al. | |

(Continued)

OTHER PUBLICATIONS

U.S. Pat. No. 11,983,579, Application Programming Interface (API) Management and Development, May 14, 2024.

(Continued)

*Primary Examiner* — Chat C Do
*Assistant Examiner* — William C Wood
(74) *Attorney, Agent, or Firm* — Knobbe, Martens, Olson & Bear, LLP

(57) ABSTRACT

The present disclosure relates to systems and techniques for developing APIs that utilize multiple pre-existing APIs. The present disclosure also relates to a user interface that allows for chaining APIs together as a function of multiple pre-existing APIs. The present disclosure also relates to security and authorization of a user to execute one or more APIs as part of an API chain.

17 Claims, 7 Drawing Sheets

(56) References Cited

U.S. PATENT DOCUMENTS

| | | |
|---|---|---|
| 2016/0077895 A1 | 3/2016 | Laredo et al. |
| 2016/0103750 A1* | 4/2016 | Cooper .............. G06F 11/3495 |
| | | 719/328 |
| 2017/0344191 A1 | 11/2017 | Zandee et al. |
| 2018/0210768 A1* | 7/2018 | Dai ........................ G06F 9/541 |
| 2018/0288025 A1* | 10/2018 | Poliashenko ....... H04L 63/0281 |
| 2018/0357094 A1 | 12/2018 | Kim |
| 2019/0104041 A1 | 4/2019 | Tabak et al. |
| 2019/0196796 A1 | 6/2019 | Bahrami et al. |
| 2023/0067552 A1 | 3/2023 | Caudill et al. |

OTHER PUBLICATIONS

U.S. Pat. No. 11,467,887, Application Programming Interface (API) Management and Development, Oct. 11, 2022, Caudil et al.
U.S. Appl. No. 17/933,310, Application Programmimg Interface (API) Management and Development, Sep. 19, 2022.

* cited by examiner

*400*

*402* EXECUTE FIRST API

*404* RECEIVE OUTPUT FROM FIRST API

*406* EXECUTE SECOND API BASED ON OUTPUT RECEIVED FROM FIRST API

APPLICATION PROGRAMMING INTERFACE (API) MANAGEMENT AND DEVELOPMENT

CROSS-REFERENCE TO RELATED APPLICATIONS

This application is a continuation of U.S. application Ser. No. 17/933,310, filed Sep. 19, 2022, which is a continuation of U.S. application Ser. No. 15/961,535, filed Apr. 24, 2018, now U.S. Pat. No. 11,467,887, which claims benefit of priority to U.S. Provisional Application No. 62/641,615, filed Mar. 12, 2018. Each of the foregoing applications of which are hereby incorporated by reference in their entireties. Any and all applications for which a foreign or domestic priority claim is identified in the Application Data Sheet as filed with the present application, are hereby incorporated by reference in their entirety under 37 CFR 1.57.

TECHNICAL FIELD

The present disclosure relates to systems and techniques for Application Programming Interface ("API") development.

BACKGROUND

APIs may have unique inputs, outputs, definitions, parameters, names, paths, types, etc. that are required for use of the API.

SUMMARY

The systems, methods, and devices described herein each have several aspects, no single one of which is solely responsible for its desirable attributes. Without limiting the scope of this disclosure, several non-limiting features will now be discussed briefly.

The present disclosure relates to systems and techniques for developing APIs that utilize multiple pre-existing APIs. The present disclosure also relates to a user interface that allows for chaining APIs together as a function of multiple pre-existing APIs. The present disclosure also relates to security and authorization of a user to execute one or more APIs as part of an API chain.

In various embodiments, a system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458). The various embodiments of interactive and dynamic user interfaces of the present disclosure are the result of significant research, development, improvement, iteration, and testing and in some embodiments, provide a particular manner of summarizing and presenting information in electronic devices. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of updating data fields for multiple APIs that a user would like to call in a chain of API calls and may enable a user to more quickly access, navigate, assess, and utilize such information relating to APIs than with previous systems which can be slow, complex and/or difficult to learn, particularly to novice users. For example, users would face the problem of having to drill down through many layers to get desired data or achieve desired results. It is an object of the present disclosure to allow users to more easily see, access and/or specify the most relevant data with respect to chaining API calls for execution.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing API utilization and execution is limited in various ways (e.g., manual review is slow, costly, and less accurate; data is too voluminous or esoteric; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data. In addition, a specific manner of displaying a limited set of API information to a user is disclosed that results in an increased efficiency in displaying and allowing user interactions with multiple APIs, such as allowing the user to choose multiple APIs to include in a combined API.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Reference will now be made to the accompanying drawings, which illustrate exemplary embodiments of the present disclosure. In the drawings.

DETAILED DESCRIPTION

Figure 1:
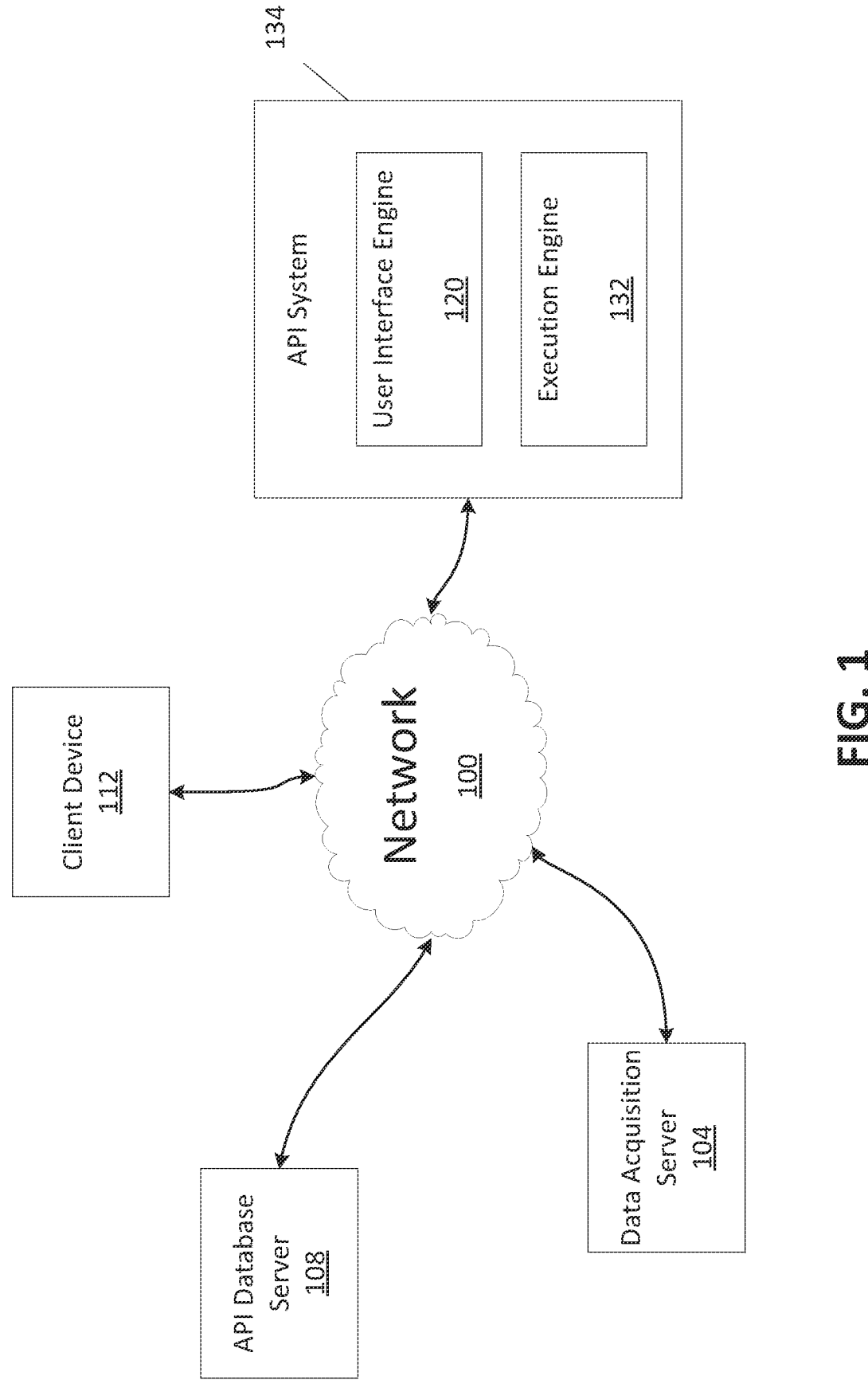
FIG. 1 is a block diagram showing various aspects of an API database system, a user interface system and a network environment in which the database system and user interface system may be implemented, according to various embodiments of the present disclosure.

Reference will now be made in detail to example embodiments, the examples of which are illustrated in the accompanying drawings. Whenever possible, the same reference numbers will be used throughout the drawings to refer to the same or like parts.

To make use of multiple APIs, output of one API can be processed, conditioned and passed on as an input to the next API. For example, a developer may parse through the a JSON array that is output by a first API, process the information therein, and determine what information is relevant for passing on to a next API call. However, this process is time consuming and assumes the developer is familiar with the output data from the first API and knows how to modify some or all of that data for input to a next API.

Embodiments of the present disclosure relate to systems, methods, and computer-readable mediums that facilitate creating, executing and storing combined APIs (also referred to herein as API chains or chained APIs). Chained APIs may be created by selecting a set of pre-existing APIs from an API library and then specifying the relationship between those APIs via user-defined parameters.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid-state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Item or Item: A data container for information representing specific things in the world that have a number of definable properties. For example, a data item can represent an entity such as a physical object, a parcel of land or other real property, a market instrument, a policy or contract, or other noun. Each data item may be associated with a unique identifier that uniquely identifies the data item. The item's attributes (e.g. metadata about the object) may be represented in one or more properties. Attributes may include, for example, a geographic location associated with the item, a value associated with the item, a probability associated with the item, an event associated with the item, and so forth.

Overview

Reference will now be made in detail to example embodiments, the examples of which are illustrated in the accompanying drawings. Whenever possible, the same reference numbers will be used throughout the drawings to refer to the same or like parts.

Disclosed herein are various systems and methods for creating chained APIs and store the chained APIs for future use and further development. The systems and methods allow a user to specify various API calls that are to be used in a chained API call. The systems and methods also allow a user to specify all parameters necessary to run each API call before executing the first API call in the chain. The system may be implemented using a graphical user interface ("GUI") that displays the API calls and data parameters fields associated with each API.

For example, a user may be able to create a new API call by chaining together multiple, e.g., three, pre-existing APIs chosen from an API repository (e.g., an API database). For instance, the three, pre-existing APIs may be designed to individually: (1) open a new transaction, (2) write a file to a transaction, and (3) close a transaction, respectively. Thus, a user who wishes to execute these three functions as part of a single API may first designate a plurality of APIs to be executed. However, before any API is executed, the user may specify values associated with arguments for each of the three APIs and may designate identifiers and/or rules for processing the response from each specified API. For example, a user interface may allow the user to identify correlations between particular outputs of APIs to particular inputs of other APIs (that may not be commonly named or in a same data format). The user may be able to provide these inputs using a graphical user interface (GUI) that is configured to accept input with respect to each API. Once created, the chained API call may be saved in an API database for future use.

Exemplary User Interface of API Chaining System

To provide a framework for the following discussion of specific systems and methods described herein, an example API development system 134 with a user interface engine 120 will now be described with reference to FIGS. 1 and 2A-B. This description is provided for the purpose of providing an example and is not intended to limit the techniques to the example user interface, the example database system, or the example API development system's use of a graphical user interface ("GUI") to represent information.

FIG. 1 is a block diagram showing various aspects of an API system 134, an API database 108 and a network environment 100 in which the API system 134 and API database 108 may be implemented, according to various embodiments of the present disclosure. Example API system 134 comprises a user interface engine 120, a performance estimation engine (not shown), a scheduling engine (not shown), and an execution engine 132. System 134 may be connected via a network 100 to other computing devices, such as a data acquisition server 104, an API database server 108, or a client device 112. API System 134 may, e.g., via execution engine 132, send and receive data to/from API database server 108 and/or data acquisition server 104. For example, execution engine 132 may connect to API database server 108 through an application programming interface (API) and retrieve or submit data to/from a database maintained on API database server 108 through appropriate API calls. Similarly, execution engine 132 may receive data from an API or ABI (application binary interface) from data acquisition server 104. In addition, API database server 108 or data acquisition server 104 may be located as part of API system 134. Furthermore, user interface engine 120 or execution engine 132 may be separate from API system 134 and may comprise their own entities independent of one another.

API database server 108 stores a plurality of preconfigured APIs that can be called through the network 100 via client device 112 and/or API system 134. API database server 108 may be a remote cloud server, local server, or suitable computing system. In addition, one or more APIs may also be stored locally on client device 112. The APIs from client device 112 may be uploaded or saved to API database server 108 or another API database entirely. For example, an API may be transmitted from client device 112 through network 100 or API system 134 and stored at another computer for further processing or utilization.

User interface engine 120 may allow system 134 to interact with the user. User interface engine 120 may generate a user interface, such as a graphical user interface (GUI). The GUI or other interface may be displayed on a client device, such as client device 112. User interface engine 120 may also receive data entered by a user into a client device, such as client device 112, and may store and/or forward it to the other various components of system 134. Client device 112 may, for example, be a user's desktop computer, notebook computer, smartphone, or any other type of computing device and associated software, e.g. a browser capable of rendering output from information provided by user interface engine 120.

Execution engine 132 may provide for execution of a sequence of instructions, such as software instructions. Execution engine 132 may be implemented as, for example, a script interpreter (e.g. a Python or Lua interpreter), a binary loader (e.g. an ELF or PE executable loader), or other execution facilities, such as a just-in-time (JIT) compiler such as a Java Virtual Machine (JVM) or .NET Runtime.

The network environment of FIG. 1 may be used to create a chain of APIs where a user interface 120 may be provided to facilitate the presentation of available APIs and the collection of data for chaining and running multiple APIs together.

Figure 2A:
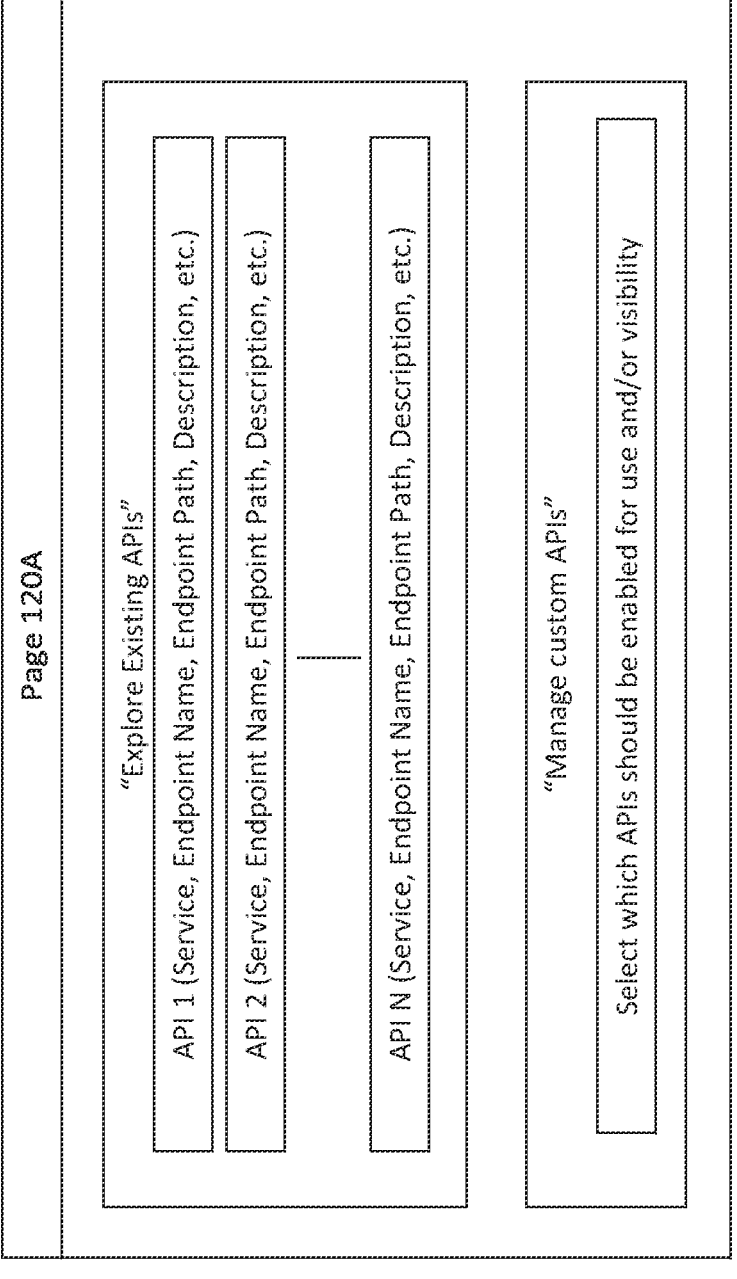
FIGS. 2A and 2B illustrate sample user interfaces showing various aspects of developing an API chain, according to various embodiments of the present disclosure.

With reference now to FIG. 2A, user interface engine 120 (FIG. 1) may present a page, such as page 120A, for a user to explore existing APIs, manage custom APIs, identify multiple APIs to be chained (in series and/or in parallel) in a combined API, etc. In an example embodiment, a user may be able to view multiple API names on page 120A. For example, a user may provide a keyword search term whereby a relevant set of APIs may be presented on the page for the user to browse or scroll through, obtain additional information regarding a particular API, and select the APIs that are to be chained in a combined API.

For example, in FIG. 2A, the option to explore existing APIs may be provided. The existing APIs may be provided as part of a table with rows and columns. In addition, information for each API may be provided as part of the user interface. For example, information regarding each API may include the name of a service provided by the API, an API endpoint (e.g., an endpoint path, name, etc.), and/or a description associated with an API.

In some embodiments, APIs may be sorted for display based on various criteria, such as service category which may provide API categories at a broad level. Each category of API may have one or more APIs associated with the category. For example, the service may be Service X and the subcategory may be Service X1. In addition, Service X2 may be found within the category of Service X. The listing for the subcategories may be hidden until a user chooses to expand the category by providing an associated command. Each subcategory (i.e., microservice) may be associated with one or more APIs that each have an endpoint that corresponds to the API.

As noted above, an endpoint may include one or more of a name of an endpoint, a network address of an API, and/or other information regarding the API. In some embodiments, an endpoint name may correspond to (or include) the network address of the API. Some endpoints may correspond to a location within a computing device such as a computer or handheld device.

In addition, an endpoint and description may be associated with each service or microservice (i.e., subcategory). For example, along the same row identifying Service X1, a column for Endpoint may include an endpoint name. The endpoint name may correspond to an API name that uniquely identifies an API path or endpoint path.

Lastly, the user interface may include a third column providing a description of the service or API. The description might provide information on the arguments, responses, or endpoint paths.

Once a category or subcategory of existing API services has been identified or selected, an endpoint associated with the service may be automatically populated or presented to the user as part of the user interface.

In other embodiments, API data may be sorted, filtered, and/or displayed in other manners to facilitate an interactive user interface allowing the user to select multiple APIs to be included in a combined API (as discussed further below).

In addition to visually showing relationships between the data objects, the user interface may allow various other manipulations. For example, the objects within database 108 may be searched using a search interface (not shown) (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the API systems disclosed herein allow users to interact and analyze electronic data in a more analytically useful way. Graphical user interfaces allow the user to visualize otherwise obscure relationships and patterns between different data objects. The present disclosure allows for greater scalability by allowing greater access and search capabilities regardless of size. Without using the present disclosure, observation and use of such relationships would be virtually impossible given the size and diversity of many users' present databases.

The APIs may be selected to receive information about the particular API, example use cases for the API or how the API may be configured to work with other APIs. The descriptive information may be preconfigured by a user or administrator of the API system or it may be automatically generated by a machine learning algorithm, artificial intelligence, etc. In some examples, additional information about an API may automatically present itself when a user hovers a cursor over an individual API. In other examples, a user may need to click on the API to receive further information.

In an embodiment, a non-administrative user may only have access to explore existing APIs, whereas a network administrator may also have access to an additional management tool embedded in the system. As part of the management tool, a user may toggle or otherwise enable an individual API or group of APIs for use as part of the user interface engine 120. For example, an existing API may be named "firstAPI," but an administrator may not want that particular API to be visible to the casual user. Thus, the administrator may toggle a switch next to that API to disable the API from appearing on any part of the current or preceding pages and/or to disable the API from being called from another API. Toggling the enable switch for a particular API may also prevent the API from appearing as a result of a keyword search conducted within the user interface.

Figure 2B:
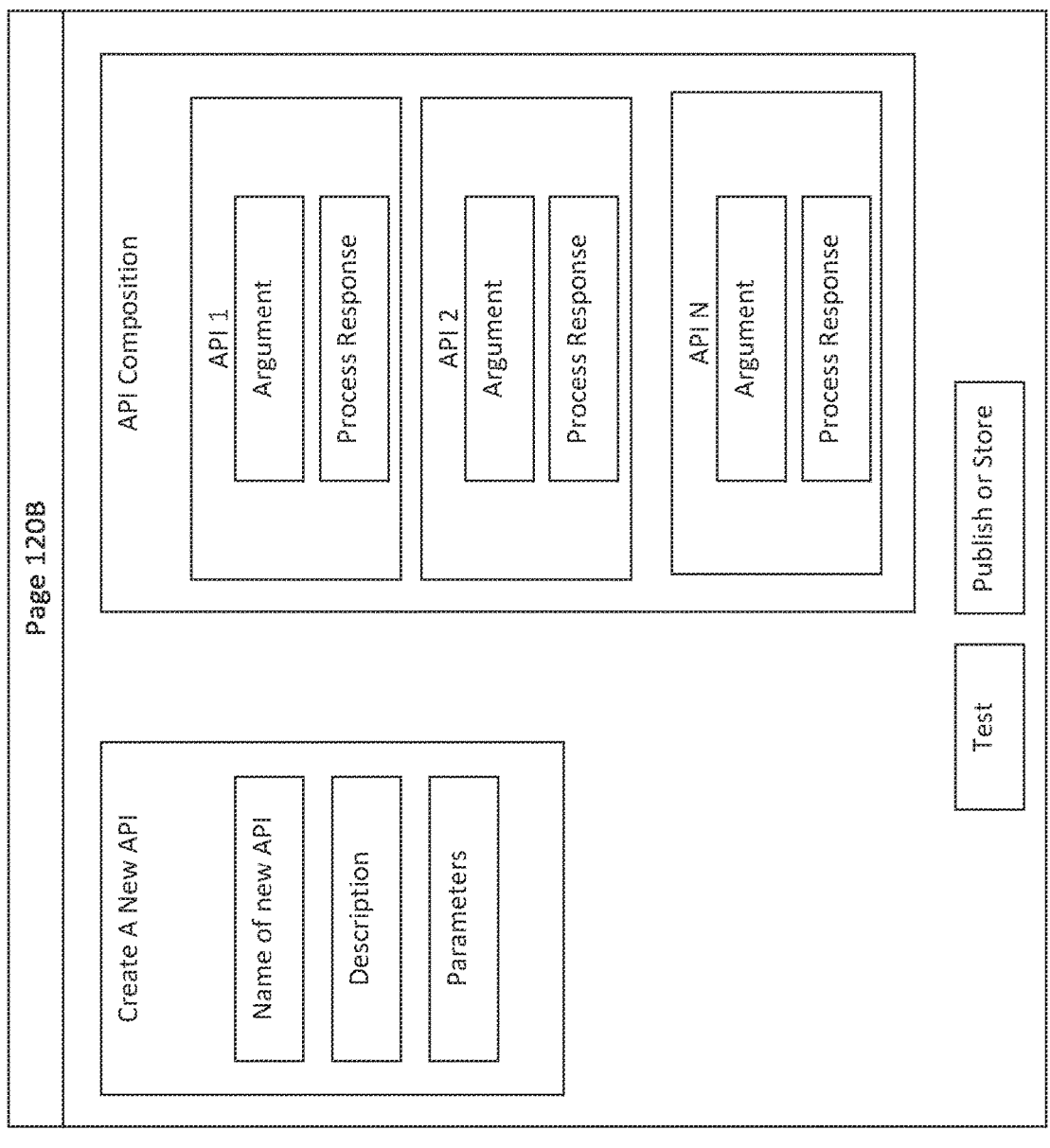

With reference now to FIG. 2B, an example page 120B of the user interface is illustrated. This page illustrates example aspects of developing an API chain in accordance with the present disclosure. For example, a portion of the page may be dedicated to information regarding creation of a new API. In an embodiment, the user at this point may provide a name for the new API, a description and various different parameters. For example, the name might be designated as "firstAPI." Additionally, a user can provide a description regarding the new combined API. Accordingly, the description can be published to other users to view in, for example, a user interface according to embodiments described herein. In an example, the description might include information necessary to run a main API along with information regarding the plurality of APIs that are set to be called (which are generally referred to as a combined API). For instance, the description may include information regarding dataset information (e.g., a dataset identifier) and target or logical path information (e.g., a file name). Lastly, parameters for the new API may be designated. Parameters may include the type (e.g., string, etc.) for any number of names, target paths, file contents, etc.

In an embodiment, a user may use a user interface to manage which APIs they would like to compose a combined API. For example, on the right hand side of the example user interface in FIG. 2B provides an illustration of where a user could manage the API composition for a new API. Based on the configuration of the user interface, a user can manipulate the arguments and process responses of each API in the composition such that they may be chained together forming the new combined API. For example, a user may want to create a new API that opens a new transaction, writes a file to it, and closes the transaction. Thus, the user may select, for API 1, the API with endpoint name "firstAPI." In addition, API 2 may have the endpoint name "secondAPI," a third API may have the endpoint name "thirdAPI," and a fourth API may have the endpoint name "fourthAPI." Accordingly, a user may set the argument for each API selected and the values associated with those APIs. In a non-limiting example, the user may designate the argument and the response for each API. The process response may be designated with a name that corresponds to an input parameter and/or value for another API in the chain. In another embodiment, the argument and path may be designated such that they correspond with another selected API in the chain or an API that a user anticipates including in the API chain.

In some embodiments, the parameters for each API in the composition field will be pre-configured by, for example, a network administrator such that a user would not be required to provide any input for that particular parameter. For example, the value for the argument of API 1 "firstAPI" may be hard-coded by an administrator to be {dataset}. In some embodiments, these hard-coded/pre-configured parameters may be hidden to a user creating a new API. In other embodiments, the pre-configured parameter may be visible to the user but with a disabled data field.

Referring again to the example of FIG. 2B, the API System 134 may pass the output of one API into the next API as each API's execution is complete and a process response is returned. For example, API 1 may return a jsonPath with a name of tx_id which can then be passed on to API 3 to be referenced in the argument for transaction_id. Thus, API 2 may automatically call API 3 upon completion of API 2. In addition, API 2 may automatically call API 3 based on and using outputs from API 2 or another API that came before (e.g., API 1 in this example).

Figure 3:
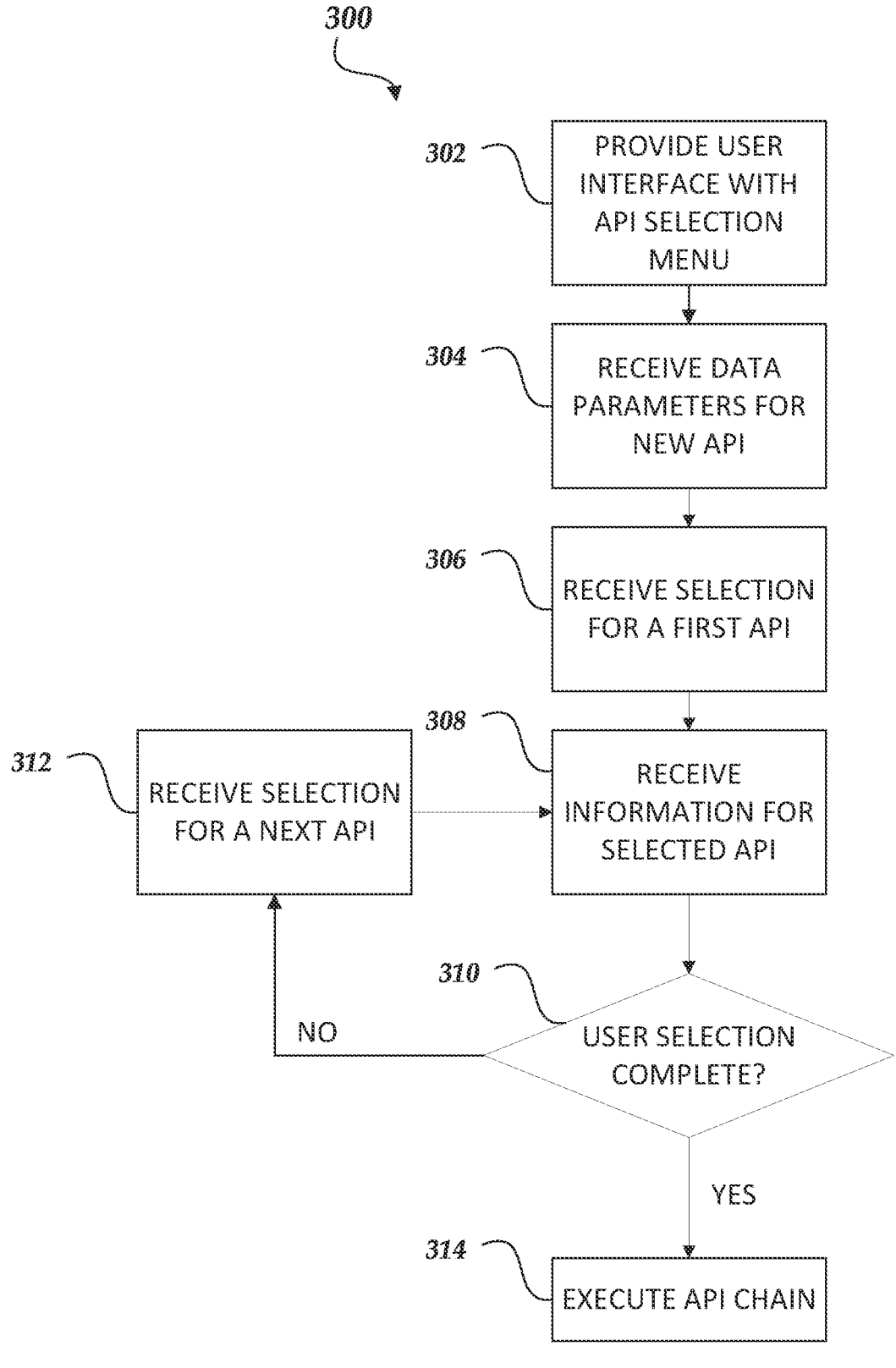
FIGS. 3 and 4 illustrate flowcharts for creating a chained API, according to certain embodiments.

FIG. 3 illustrates an example method of chaining multiple APIs together using, for example, a user interface. For purposes of illustrating a clear example, the approach of FIG. 3 is described herein with reference to FIGS. 1, 2A and 2B. However, the approach of FIG. 3 may be implemented using other mechanisms for performing the functional blocks of FIG. 3, and the particular systems of FIGS. 1, 2A and 2B are not required.

In block 302, a user interface is presented to a user on client device 112. In an embodiment, the user interface comprises a graphical user interface with one or more pages that can be configured in various different ways. In essence, the interface provides the user an ability to browse through available APIs, for example, using keyword searches, drop-down menus, filters, etc., to select multiple APIs for composing a new API. In an embodiment, an input data file may be received or uploaded to the user interface (not shown). The input data file may comprise a comma-separated value (CSV) file, a spreadsheet, XML or other input data file format. In some embodiments, the available APIs would be stored in API database server 108 or API system 134. Additionally, data acquisition server 104 may be responsible for receiving the data from client device 112 as part of API system 134 or user interface engine 120.

Additionally, at block 302, API system 134 may be configured to only show relevant APIs to a user via a user interface. For example, a user may perform a search for a specific API and based on that search query, API system 134 may then present a subset of APIs that are relevant to the underlying search query. In some embodiments, API system 134 may be preconfigured to know which APIs are relevant. Alternatively, API system 134 may be equipped with machine learning or artificial intelligence capabilities which intuitively identify and present relevant APIs based on the search query. Likewise, relevant APIs may be filtered and presented based on a selection of one or more APIs at the user interface stage. Relevant APIs may be, for example, APIs that are expected or have been proven to function as part of a chain of other APIs relevant to an overarching API architecture.

In block 304, a user may specify parameters for the new combined API. For example, the user may add multiple parameters, name them, and specify their type. In an example, the user interface may provide options to add one or more parameters, such as via selection of a user interface control (e.g., a button) to cause a new set of data fields to present themselves as a result. For example, data fields for an API name, a type, etc. may present themselves. As such, a user may enter a name for the combined API, select the type (e.g., string), and/or other parameters of the new combined API. These data parameters may be directly associated with inputs or outputs for the APIs selected from the API database or library at block 302.

In an embodiment, the API system 134 may automatically generate a full (or partial) set of existing APIs based on code repositories that each define their own API endpoints in certain standardized formats. Thus, in this embodiment, the API system 134 may examine published code to find these definitions and use them to generate the set of existing APIs, descriptions, and parameters. As an example, prior to providing the user interface with API selection menu in block 302, API system 134 may automatically generate from one or more codebases (and/or other API database servers) a set of existing APIs, which may include the full set of existing APIs contained therein or a partial set thereof. Additionally, API system 134 may automatically generate or retrieve the full or partial set of descriptions and parameters associated with each generated API. Alternatively, the same mechanics may also be conducted concurrently and/or after providing the user interface to a user at block 302.

Thus, in some embodiments, blocks 302 or 304 may include functionality whereby an API system may extract, preliminarily or concurrently, information from one or more databases containing API information (e.g., a codebase, such as API database server 108, serving as a code repository). In some embodiments, each code repository, for example, may define API endpoints associated with the API code in the code repository. In such embodiments, the API endpoints may be stored in a standardized format inherently or as preconditioned by API system 134 or another system (not shown) as the code is uploaded to a database or periodically thereafter. Accordingly, the API system may generate, either preliminarily or concurrently at blocks 302 or 304, a set of existing APIs based on the API information contained in the one or more databases or code repositories. In a non-limiting example, the system may generate a set of existing APIs and descriptions relating to one or more APIs and/or parameters associated with one or more APIs. Accordingly, the system may examine code published to a public or private database to identify API endpoint definitions that are, for example, in compliance with one or more standardized formats. The system may then use these definitions to generate the set of existing APIs, descriptions, and parameters.

Thus, in some embodiments, blocks 302 or 304 may include functionality whereby an API system may extract, preliminarily or concurrently, information from one or more databases containing API information (e.g., a codebase, such as API database server 108, serving as a code repository). In some embodiments, each code repository, for example, may define API endpoints associated with the API code in the code repository. In such embodiments, the API endpoints may be stored in a standardized format inherently or as preconditioned by API system 134 or another system (not shown) as the code is uploaded to a database or periodically thereafter. Accordingly, the API system may generate, either preliminarily or concurrently at blocks 302 or 304, a set of existing APIs based on the API information contained in the one or more databases or code repositories. In a non-limiting example, the system may generate a set of existing APIs and descriptions relating to one or more APIs and/or parameters associated with one or more APIs. Accordingly, the system may examine code published to a public or private database to identify API endpoint definitions that are, for example, in compliance with one or more standardized formats. The system may then use these definitions to generate the set of existing APIs, descriptions, and parameters.

In a non-limiting example, the API system 134 may include (and/or may provide access to) a code generator system that provides an interface, object definition language, and/or code generator capabilities that define API contracts. For example, a code generator system may act as a code generator for RESTy (REpresentational State Transfer)

APIs, such as to define API contracts for HTTP services. In addition, the system may generate clean interfaces and code for both servers and clients in one or more code-based languages. The code generator system may also provide mechanisms for decoupling server implementation details from client definitions. In some instances, the code generator system may be configured to provide general language bindings for use in client creation while remaining agnostic to client implementations. In this way, API system 134 and code generator system may be compatibly configured such that they correspond in a predictable and efficient manner.

In block 306, API system 134 receives input from, for example, client device 112 indicating a first API to be used in the combined API chain. As a result of selecting an API to be used, the system 134 determine what parameters, body, type, name, etc. are associated with the selected API. For example, system 134 may analyze the inputs and outputs for the selected API. In some embodiments, system 134 analyzes the metadata associated with an API using, for example, a Java reflections protocol, which may allow an API to be examined or "introspect" upon itself, and manipulate internal properties of the API under inspection. In addition, although block 306 is shown as occurring after block 304, block 304 may occur after, last or not at all in the process.

In block 308, data fields may be presented to a user that are associated with the selected API. In some embodiments, certain data fields will be pre-configured such that a user is unable to modify those data fields. Alternatively, a user may input data parameters in the available data fields. For example, a user may provide information for a value of an argument associated with the API. In another example, a user may provide input for a process response (e.g., json-Path, jsonBody) with a name or identifier associated with the response type, which may later be used to correlate particular response types (e.g., outputs from an API) with particular inputs to another API in a combined API. In addition, the information received may also include inputs for the selected API which may correspond to an argument and value.

In block 310, API system 134 may determine, such as based on an indication from the user, whether a user is finished with selecting APIs for the combined API chain desired. If not, the user may continue selecting APIs to be used for the API chain and block 308 may be repeated for receiving information associated with the next API, such as how the inputs of the next API correspond with outputs of one or more previously executed APIs and/or other data.

At block 312, a user is able to select multiple other APIs that are to be included in the API chain. APIs subsequent to the first API may be arranged in various different configurations including in a parallel structure and/or in a series structure. In an example, a chain of APIs may be linked in series such that a first API is followed by a second API that is followed by a third API until a final API is reached and a final result is returned. In another example, a chain of APIs may be linked in parallel such that multiple API calls are made substantially concurrently. Lastly, a chain of APIs may be linked in a combination of parallel and series API calls such that, for example, the third API from the previous example (of three serial APIs) may then be followed by multiple APIs called simultaneously, and any number of those parallel APIs may also be followed by one or more additional API calls.

Advantageously, the API system stores mapping information for the newly created combined API. For example, the mapping indicates how outputs from particular APIs correspond with inputs of other APIs. This may be indicated by mappings between input/output elements of API pairs, through use of tags or common identifiers to input/output parameters such that necessary inputs for an API may be determined based on identifying prior outputs with the same tag or identifier, or in other manners. In some embodiments, the mapping includes transformations to apply to particular data outputs to generate a particular input for another API.

With the combined API defined, the process moves to block 314 where the combined API may be executed. For example, a user may choose to test the new combined API or publish the new combined API in a database. In some embodiments, once an indication is received from the system 134 that the API chain is complete, the system 134 may automatically run the API as, for example, a test. Alternatively, system 134 may store the combined API, including the mapping of outputs to inputs, in an API database server.

The saved API chain may be included as part of future API chains by including the saved API chain in another new API resulting in compounding effects. For example, the saved API chain may be included as part of the API composition for creating a new API where the new API chain, when calling the newly saved API chain, will execute all APIs within that chain as well as all APIs within its own chain. The new API chain may be stored on a client device 112, in API database server 108 or on some other memory device, remote server, or cloud network.

With the combined API defined, at block 314 the combined API may be selected for execution by the user and/or other users. In an embodiment, execution engine 132 may execute the API chain.

In an embodiment, a user interacts with a computer to perform the aforementioned blocks to create a new API based on pre-existing APIs and define the parameters for chaining the APIs together. Assume for purposes of an example that the pre-existing API is named "firstAPI." Using the user interface engine 120, the user selects "firstAPI" and the computer generates and displays a panel that prompts the user to enter values and parameters associated with the API. The panel may selectively prompt the user based on values and/or parameters that are relevant or pertinent to the ultimate API chain.

In an embodiment, a user interacts with the computer to define a data parameter (e.g., type, name, body, argument, response, etc.) in a similar manner. Additionally, the user may specify a type for the API. Lastly, the user may specify one or more arguments and values associated with the arguments.

Figure 4:
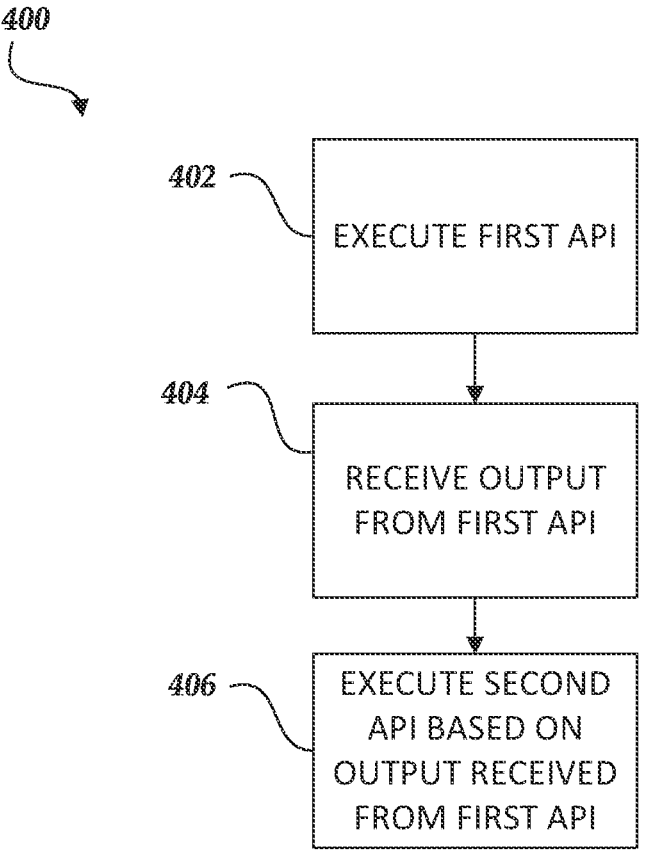

FIG. 4 illustrates a method of executing an API chain, such as may have been defined using the process of FIG. 3. For purposes of illustrating a clear example, the approach of FIG. 4 is described herein with reference to FIGS. 1, 2A and 2B. However, the approach of FIG. 4 may be implemented using other mechanisms for performing the functional blocks of FIG. 4, and the particular systems of FIGS. 1, 2A and 2B are not required.

In block 402, the first API is executed in the chain. Alternatively, a set of APIs may be executed simultaneously as part of a parallel API structure defined in the combined API. For example, execution in the first instance at block 402 may trigger the calling of multiple APIs substantially concurrently.

In block 404, a resulting output will be received by API system 134. API system 134 may then access the mapping between the first and second APIs (e.g., that was provided as part of the input of parameters in, for example, block 308 of FIG. 3) to determine inputs for the next API. In some embodiments, the output of an API may be analyzed to programmatically determine which of multiple other APIs in the API chain should be called next. For example, API 1 may have an output that triggers the calling of API 3 and API 3 may have an output that calls API 2 with appropriate inputs at each calling.

In block 406, the next API in the chain is executed. For example, execution engine 132 may process the output from the immediately preceding API calls output and determine the appropriate inputs for API 2, and perform transformations of data to generate the appropriate inputs in some implementations. Execution engine 132 may then execute API 2 with the appropriate input parameters. In some embodiments, the appropriate input parameters may be based on the output received from the immediately preceding API. Alternatively, the combined API defined by the user, or as automatically determined by the system 134 or execution engine 132, may indicate that a set of APIs should be called as part of a parallel calling. For example, system 134 may determine that APIs 2, 3, and 4 should be called next substantially concurrently based on an output received from API 1's execution (e.g., by automatically determining that one or more outputs from API 1 are sufficient to provide the needed inputs to each of API 2, 3, and 4). Alternatively, the determination that APIs 2, 3, and 4 should be called as part of a parallel calling may be previously determined by the user while selecting which APIs they would like included in the API chain.

The approach of FIGS. 3 and 4 may be implemented using other mechanisms for creating and specifying the values and elements identified for executing each API, and a particular GUI is not required.

Figure 5:
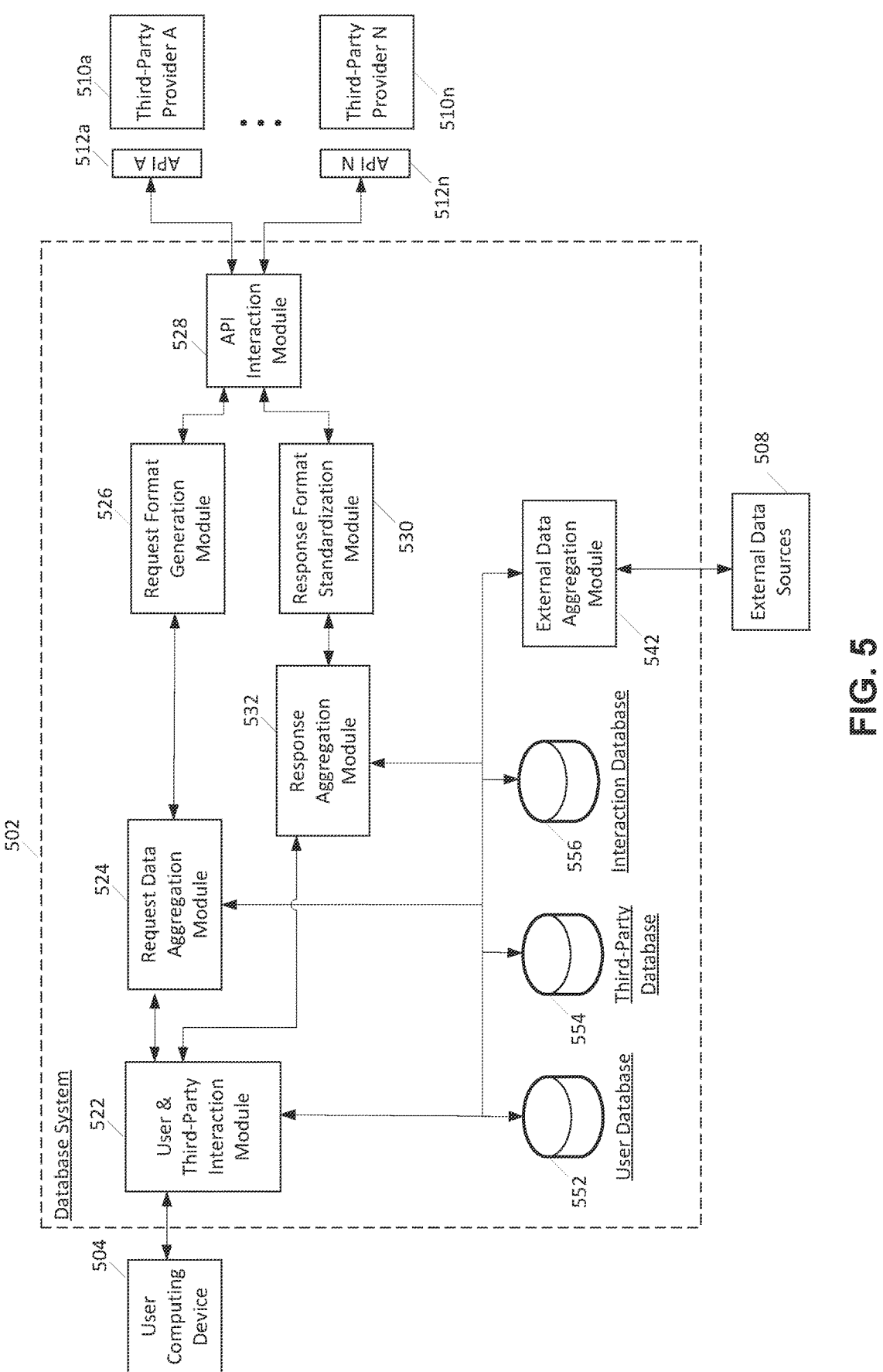
FIG. 5 is a block diagram showing various aspects of a database system and network environment in which the database system may be implemented, according to various embodiments of the present disclosure.

As indicated in FIG. 5, in an implementation the database system 502 (or one or more aspects of the database system 502) may comprise, or be implemented in, a "virtual computing environment". As used herein, the term "virtual computing environment" should be construed broadly to include, for example, computer readable program instructions executed by one or more processors (e.g., as described below in the example of FIG. 6) to implement one or more aspects of the modules and/or functionality described herein. For example, a request received from the user computing device 504 may be understood as modifying operation of the virtual computing environment to cause the request data aggregation module 524 to gather data associated with the request, the request format generation module 526 to generate third-party requests with the appropriate formats and information, and the API interaction module 528 to transmit those requests to one or more APIs.

Additionally, user and third-party interaction module 522 may include the user interface described with respect to FIGS. 1, 2A and 2B. Accordingly, interaction module 522 may be configured to access APIs stored in, for example, a user database 552, a third-party database 554, an interaction database 556, or any other external data source or database, and interact with users in developing new combined APIs and/or executing combined APIs. Interaction module 522 may also be configured to access APIs stored as part of a cloud network (not shown). In addition, database system 502 may have a system in place for analyzing and tracking API interactions and/or historical combinations through, for example, API interaction module 528. For example, API interaction module 528 may receive information regarding one or more APIs (e.g., API A 512a from third-party provider A 510a or API N 512n from third-party provider N 510n). In some instances, the provider of each API may be the same or they may be different providers providing different APIs. Accordingly, API interaction module 528 may gather and aggregate data associated with each API to present to the user at the user interface (not shown) or user and third-party interaction module 522 as well as provide input to those APIs that are received from the user computing device 504 via the user interface.

Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the request data aggregation module 524 and/or responses received and analyzed by the response aggregation module 532. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the database system 502 as a virtual computing environment may advantageously enable executing different aspects or modules of the system on different computing devices or processors, which may increase the scalability of the system. Implementing one or more aspects of the database system 502 as a virtual computing environment may further advantageously enable sandboxing various aspects, data, or modules of the system from one another, which may increase security of the system by preventing, for example, malicious intrusion into the system from spreading. Implementing one or more aspects of the database system 502 as a virtual computing environment may further advantageously enable parallel execution of various aspects or modules of the system, which may increase the scalability of the system. Implementing one or more aspects of the database system 502 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

In various embodiments, outgoing requests and/or incoming responses may be communicated in any suitable formats. For example, XML, JSON, and/or any other suitable formats may be used for API requests and responses. In some implementations, the system may advantageously, as described above, convert data from one format to another (e.g., based on templates) to enable communications with multiple third-parties and API. Such implementations may be particularly advantageous as the system is enabled to scale and communicate via ever more disparate API's over time, and be easily adapted to changes in existing API's as needed.

Authentication

Additionally, in some implementations communications with one or more API's may be encrypted and/or authenticated. For example, public and/or private key exchanges may take place to establish authenticated and/or encrypted communications between, e.g., the system and computing systems of third-parties, to, e.g., protect user data from exposure to potentially malicious actors.

In a chained API process, the public and/or private key may be identified before execution of the first API. The API system 134 may require a uniquely encrypted token or identifier for authenticating a user's access to use or view certain APIs in an API database. As such, a unique user token may be provided to each user, group of users, or class of users. The token provided may then be provided by the user as part of a data field at the user interface, for example. The user token may then be passed along to some or all of the separate API's of the API chain. If the token is inadequate to grant access to the user at any point along the chain, the chain will fail and the user will not be able to use that API as part of their call. Alternatively, the determination that a user is not authorized to call a specific API or set of APIs may be made at an earlier stage before execution of the first API (or first set of APIs if the chain includes parallel calling). For example, the user may need to provide a token when selecting APIs to be included as part of the chained API composition. In this way, a user will know quickly which APIs they will be able to include in a desired call and which they cannot.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid-state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions. For example, any of the processes, methods, algorithms, elements, blocks, applications, or other functionality (or portions of functionality) described in the preceding sections may be embodied in, and/or fully or partially automated via, electronic hardware such as application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
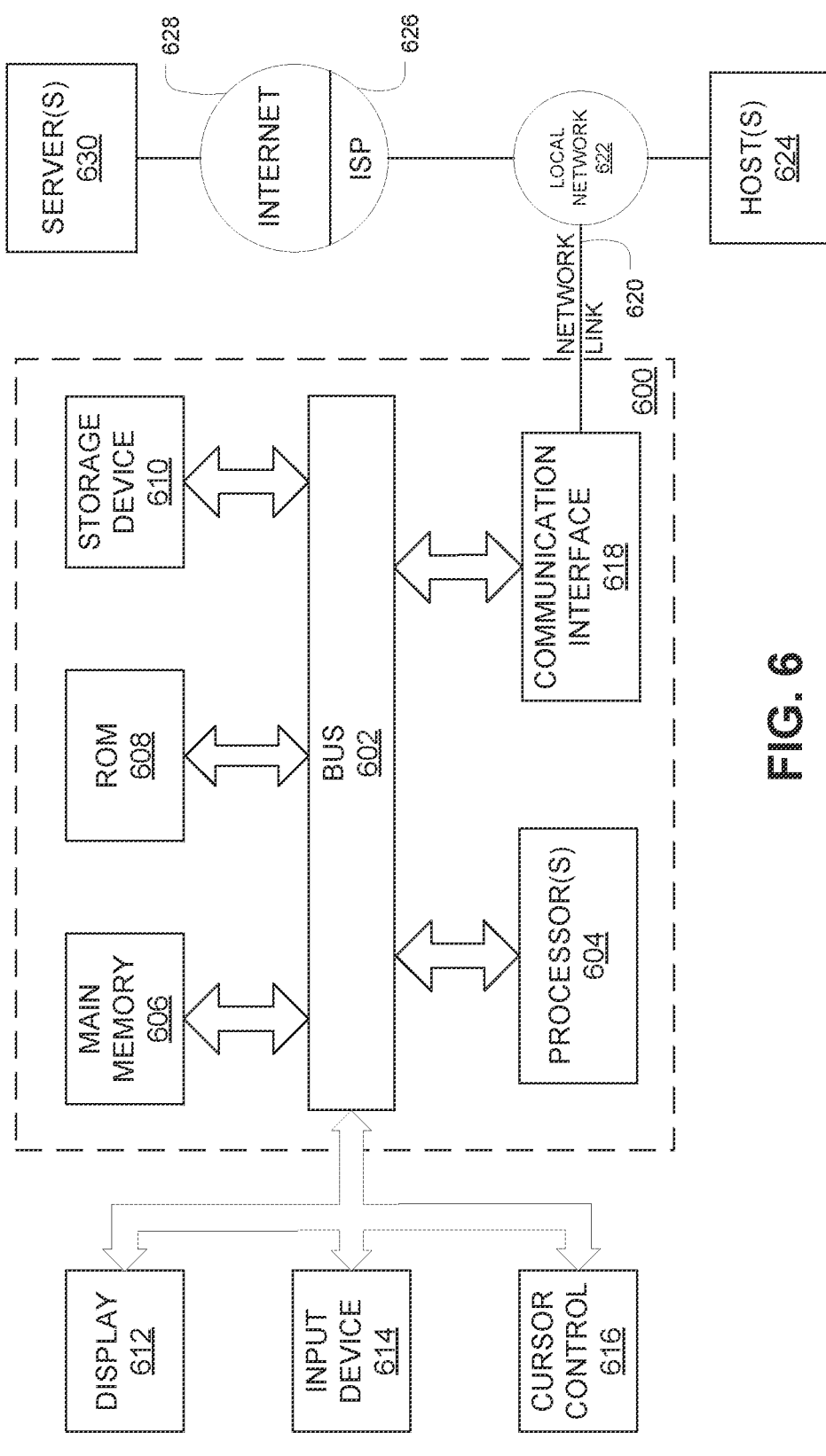
FIG. 6 illustrates a computer system with which certain methods discussed herein may be implemented.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general-purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604.

Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
a computer readable storage medium having program instructions embodied therewith; and
one or more computer hardware processors configured to execute the program instructions to cause the computing system to:
provide one or more user interfaces allowing an administrator and a user to view information relating to a plurality of APIs of a combined API and linked execution of the plurality of APIs of the combined API;

receive, via the one or more user interfaces, an administrator selection to disable display of an API of the plurality of APIs within the one or more user interfaces to the user;
in response to the administrator selection, disable display of the API to the user via the one or more user interfaces, without disabling executability of the API, to prevent the user from viewing and configuring the API, wherein disabling display of the API to the user includes disabling display of a first parameter of the API from a plurality of parameters of the API to prevent the user from viewing and configuring the first parameter of the API, wherein the first parameter is associated with one or more of a name, input, output, or file content of the API;
responsive to a user query, cause display of one or more resultant APIs related to the user query within the one or more user interfaces to the user without displaying the API to allow the user to view and configure the one or more resultant APIs, wherein the API is related to the user query;
update one or more parameters of the one or more resultant APIs based on a configuration from the user within the one or more user interfaces; and
responsive to execution of the combined API:
cause the API to execute based on a pre-configuration of the API; and
cause the one or more resultant APIs to execute based on the one or more updated parameters.

2. The computing system of claim 1, wherein the user query comprises a keyword provided from the user via the one or more user interfaces.

3. The computing system of claim 1, wherein the one or more computer hardware processors are configured to execute the program instructions to cause the computing system to:
receive the pre-configuration of the API from the administrator via the one or more user interfaces, the pre-configuration comprising one or more hard-coded parameters of the API.

4. The computing system of claim 1, wherein the one or more computer hardware processors are configured to execute the program instructions to cause the computing system to:
receive, via the one or more user interfaces, a user definition for the combined API involving linked execution of the plurality of APIs.

5. The computing system of claim 1, wherein the one or more computer hardware processors are configured to execute the program instructions to cause the computing system to:
receive, via the one or more user interfaces, a user selection of API parameters for the plurality of APIs, wherein the API parameters include arguments and responses for the plurality of APIs.

6. The computing system of claim 1, wherein the one or more computer hardware processors are configured to execute the program instructions to cause the computing system to:
receive, via the one or more user interfaces, a user-defined transformation for updating an output of a first API of the plurality of APIs from a first data format to a second data format to generate an input to a second API of the plurality of APIs having the second data format.

7. The computing system of claim 1, wherein the one or more computer hardware processors are configured to execute the program instructions to cause the computing system to:

receive, via the one or more user interfaces, an execution structure configured to execute the plurality of APIs according to an execution order.

8. A computer-implemented method comprising:

providing one or more user interfaces to allow an administrator and a user to view information relating to a plurality of APIs of a combined API and linked execution of the plurality of APIs of the combined API;

receiving, via the one or more user interfaces, an administrator selection to disable display of an API of the plurality of APIs within the one or more user interfaces to the user;

in response to the administrator selection, disabling display of the API to the user via the one or more user interfaces to prevent the user from viewing and configuring the API, wherein disabling display of the API to the user includes disabling display of a first parameter of the API from a plurality of parameters of the API to prevent the user from viewing and configuring the first parameter of the API;

responsive to a query, causing display of one or more resultant APIs related to the query within the one or more user interfaces to the user without displaying the API to allow the user to view and configure the one or more resultant APIs, wherein the API is related to the query;

updating one or more parameters of the one or more resultant APIs based on a configuration from the user within the one or more user interfaces; and responsive to execution of the combined API:

causing the API to execute based on a pre-configuration of the API; and causing the one or more resultant APIs to execute based on the one or more updated parameters.

9. The computer-implemented method of claim 8 further comprising:

receiving, via the one or more user interfaces, a keyword from the user forming at least a part of the query to search for the one or more resultant APIs related to the query.

10. The computer-implemented method of claim 8 further comprising:

receiving the pre-configuration of the API from the administrator via the one or more user interfaces, the pre-configuration comprising one or more hard-coded parameters of the API.

11. The computer-implemented method of claim 8 further comprising:

receiving, via the one or more user interfaces, a user definition for the combined API involving linked execution of the plurality of APIs.

12. The computer-implemented method of claim 8 further comprising:

receiving, via the one or more user interfaces, a user selection of API parameters for the plurality of APIs, wherein the API parameters include arguments and responses for the plurality of APIs.

13. The computer-implemented method of claim 8 further comprising:

receiving, via the one or more user interfaces, a user-defined transformation for updating an output of a first API of the plurality of APIs from a first data format to a second data format to generate an input to a second API of the plurality of APIs having the second data format.

14. Non-transitory computer-readable media including computer-executable instructions that, when executed by a computing system, cause the computing system to perform operations comprising:

providing one or more user interfaces to allow an administrator and a user to view information relating to a plurality of APIs of a combined API and linked execution of the plurality of APIs of the combined API;

receiving, via the one or more user interfaces, an administrator selection to disable display of an API of the plurality of APIs within the one or more user interfaces to the user;

in response to the administrator selection, disabling display of the API to the user via the one or more user interfaces to prevent the user from viewing and configuring the API, wherein disabling display of the API to the user via the one or more user interfaces includes disabling display of a first parameter of the API from a plurality of parameters of the API to prevent the user from viewing and configuring the first parameter of the API;

responsive to a query, causing display of one or more resultant APIs related to the query within the one or more user interfaces to the user without displaying the API to allow the user to view and configure the one or more resultant APIs, wherein the API is related to the query;

updating one or more parameters of the one or more resultant APIs based on a configuration from the user within the one or more user interfaces; and responsive to execution of the combined API:

causing the API to execute based on a pre-configuration of the API; and causing the one or more resultant APIs to execute based on the one or more updated parameters.

15. The non-transitory computer-readable media of claim 14 wherein the computer-executable instructions, when executed by the computing system, cause the computing system to perform operations comprising:

receiving, via the one or more user interfaces, a keyword from the user forming at least a part of the query to search for the one or more resultant APIs, wherein the one or more resultant APIs are related to the keyword.

16. The non-transitory computer-readable media of claim 14 wherein the computer-executable instructions, when executed by the computing system, cause the computing system to perform operations comprising:

receiving the pre-configuration of the API from the administrator via the one or more user interfaces, the pre-configuration comprising one or more hard-coded parameters of the API.

17. The non-transitory computer-readable media of claim 14 wherein the computer-executable instructions, when executed by the computing system, cause the computing system to perform operations comprising:

receiving, via the one or more user interfaces, a user definition for the combined API involving linked execution of the plurality of APIs.

* * * * *